United States Patent Office 3,232,742
Patented Feb. 1, 1966

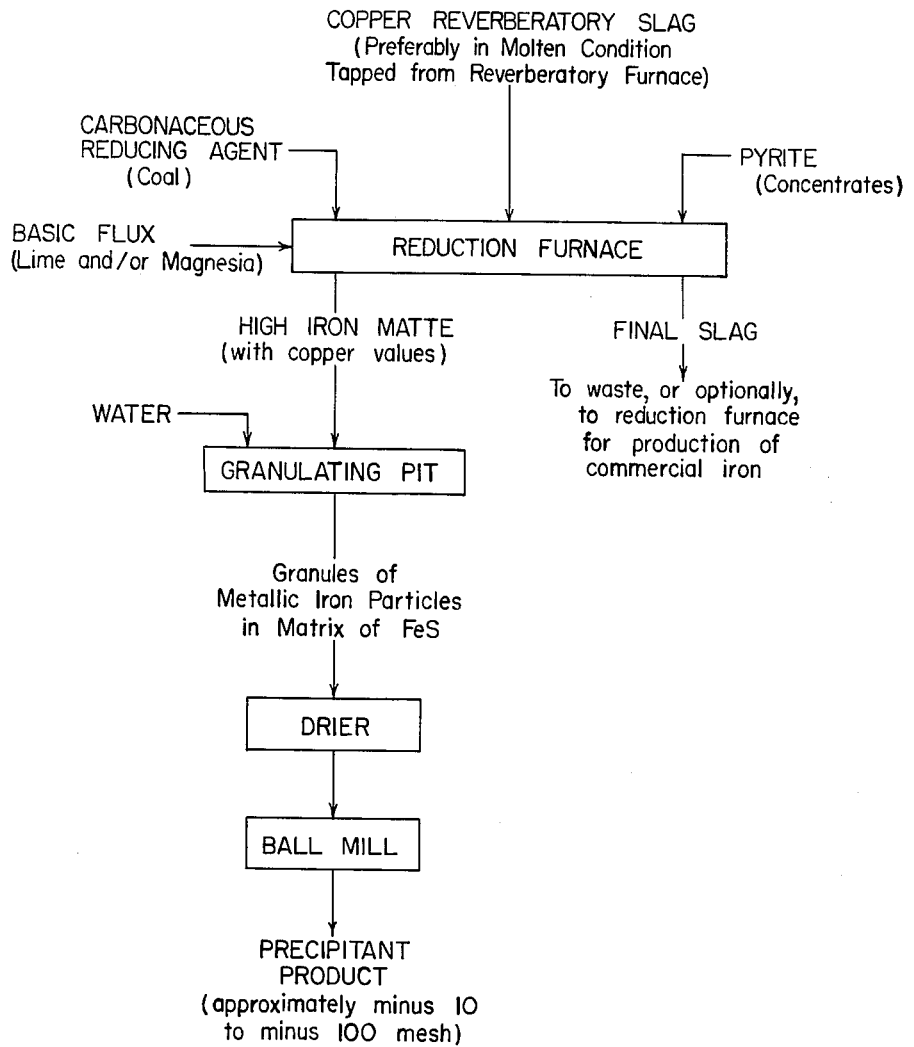

3,232,742
USING IRON-IRON SULFIDE PRODUCT TO PRECIPITATE COPPER FROM A COPPER-BEARING SOLUTION
Stuart R. Zimmerley, Alexander E. Back, and Russell R. Beck, Salt Lake City, Utah, assignors to Kennecott Copper Corporation, New York, N.Y., a corporation of New York
Filed Apr. 3, 1963, Ser. No. 270,276
9 Claims. (Cl. 75—.5)

This invention relates to the metallurgical arts and involves both a new metallurgical product and the method used in producing it. The product contains particles of metallic iron dispersed throughout a predominantly iron sulfide matrix, is brittle and easily reduced in size as desired, and is useful primarily as a precipitant for copper in solution, although there are other possible uses, e.g. as a catalyst or as a source of metallic iron for other purposes.

Aqueous solutions of copper, such as are commonly derived by the leaching of copper-bearing ore materials with a dilute solution of sulfuric acid and ferric sulfate, are ordinarily stripped of their copper content by passage over scrap iron, such as detinned and shredded tin cans, or by being brought into contact with metallic iron by agitation therewith in a liquid-solids contact vessel. The iron reacts with the solution to replace the copper with ferrous sulfate and leave metallic copper as a precipitate, i.e. "cemented."

It has long been recognized that this so-called "cementation" process of recovering copper from solution could be made more efficient by utilizing metalic iron having a higher surface area to unit weight ratio. High purity iron is difficult to divide into particle form to provide the requisite surface area. Sponge iron produced by the direct reduction of high grade, iron-oxide-bearing materials is ideal from this standpoint. It is a relatively high cost product, however, and for successful production, requires certain types and grades of iron-bearing materials and special processing techniques, if there is to be no undue loss by oxidation.

A principal object in the making of the present invention was to provide a satisfactory metallic iron precipitant having a good surface area to weight ratio, one which can be advantageously used in place of the customary scrap iron or sponge iron, can be economically produced from the normally waste iron-silicate slags resulting from standard copper smelting operations, and can be easily sized as desired for most advantageous use.

An important feature of the product resides in the fact that it is made up of a multiplicity of particles of metallic iron dispersed in a matrix of brittle metallic sulfide. Due to the friable nature of the sulfide and the finely divided character of the metallic iron, the product is susceptible of being easily crushed or ground to practically any required size for use. The metallic iron is already in sufficiently small, particle form to require no further reduction in size, and the brittle, metallic sulfide matrix is easily crushed or ground. It has been found that the many particles of metallic iron, which are wholly or partially exposed to the action of the copper-bearing solution when the product of this invention is used for the precipitation of copper, results in highly efficient recovery.

The product can be produced in various ways from various materials so long as there is a molten solution of iron and sulfur, wherein the ratio of iron to sulfur is effectively in excess of the stoichiometric ratio for FeS to produce a multiplicity of metallic iron particles, and so long as the cooling rate of the molten solution is rapid. When the cooling rate is too slow, the metallic iron precipitated from the solution tends to segregate and to settle from the sulfide phase before final solidification. With rapid cooling, fine metallic iron particles are precipitated throughout the sulfide phase as a matrix and tend to be uniformly dispersed therein.

The size of the iron particles is primarily a function of the cooling rate. A wide range of sizes can be obtained by close control of cooling. A highly advantageous size range of from about 5 to 10 microns is obtainable by water quenching of the water solution of iron and sulfur.

The process is essentially a smelting operation, advantageously carried out in an electric furnace and controlled to produce a high-iron, sulfur-deficient matte. A typical product contains about 85% total iron, 65% metallic iron, and 12% sulfur.

A distinct advantage of the invention to copper producers is the fact that copper reverberatory slag in molten condition, as tapped from a reverberatory furnace, can be run directly into a smelting furnace for the production of the present product, with practically no loss of heat. Thus, there is a considerable saving in fuel costs, as well as utilization of a normally waste product as raw material. The only additional raw materials required are a sulfur-bearing material, advantageously iron pyrite concentrates, and a carbonaceous reducing agent, e.g. coal.

One of the advantages of the invention is the fact that copper is recovered from the copper reverberatory slag as an incident to the production of the dispersed iron precipitant product and that, if it is not desired to utilize all the iron for the precipitant product, the remainder can be recovered from the final slag as commercial iron.

Both the product and the process of the invention are described in detail and the process is illustrated in the accompanying drawing with respect to specific forms and procedures presently regarded as the best modes of carrying out the invention in commercial practice.

In the drawing, the single figure is a flowsheet representative of the process.

As illustrated by the drawings, the process is most advantageously carried out by running a molten iron-silicate slag, tapped from a reverberatory furnace for the smelting of copper concentrates, directly into an auxiliary smelting furnace (preferably an electric arc furnace), where it is subjected to smelting heat in the presence of a carbonaceous reducing agent (preferably finely divided coal) and pyrite (preferably concentrates derived from the flotation of mill tailings).

The coal and pyrite concentrates are preferably charged onto the surface of the molten bath of slag in the furnace and sufficient electrical energy supplied to heat the charged materials to a temperature at which the pyrite decomposes. Approximately half or the sulfur contained by the pyrite is volatilized, and a molten iron sulfide (FeS) is produced. In addition, metallic iron is reduced from the slag by the coal.

The iron sulfide and the metallic iron settle from the slag and collect at the bottom of the furnace as a molten solution of iron and sulfur.

The several materials charged into the furnace are so proportioned and the smelting procedure is so controlled in accordance with techniques well known to the art that the ratio of iron to sulfur in the molten solution of iron and sulfur is considerably in excess of the stoichiometric ratio for FeS, whereby upon rapid cooling of such solution, a substantial quantity of uncombined iron is precipitated from the molten solution. The resulting product comprises particles of metallic iron in a matrix of metallic sulfides, predominantly iron sulfide, with a metallic iron content of from about 20 to 85 percent by weight of the product.

By running the molten solution of iron and sulfur, as tapped from the smelting furnace, into water, a granulated product is obtained made up of granules about the size of buck shot. Each granule has a solidified micro structure comprising particles of metallic iron in a matrix of iron sulfide.

The iron sulfide-metallic iron product is easily crushed or ground to very fine particle size, whereby the metallic iron particles are released or exposed for effective use as a copper precipitant. The finer grinds, e.g. minus 100 mesh, will react more rapidly and more completely and are preferred for the well known leaching-precipitation-flotation (LPF) processes. Yet, the coarser grinds, e.g. minus 10 mesh, are more desirable for certain types of operations, for example, where a fluidized bed of the precipitant is employed. In operations of the later type, only slight reduction in iron utilization is encountered.

In a typical instance of use of the process on an experimental basis, the raw materials employed had the following analyses:

*Copper reverberatory, iron silicate slag*

| | Percent |
|---|---|
| Fe | 35.6 |
| Cu | .48 |
| $SiO_2$ | 35.5 |
| CaO | 5.1 |
| MgO | 1.3 |
| $Al_2O_3$ | 5.4 |

*Pyrite concentrate*

| | Percent |
|---|---|
| Fe | 40.9 |
| S | 44.7 |
| Cu | .55 |

*Coal*

| | Percent |
|---|---|
| Fixed carbon | 47.3 |
| Volatile matter | 44.0 |
| Ash | 8.7 |

A 200-pound charge of the copper reverberatory slag (solidified) was melted in a 250 kva. electric arc furnace, after which 44 pounds of the pyrite concentrates and 30 pounds of the coal were added to the surface of the molten slag bath. This furnace charge was subjected to reduction smelting heat to obtain a molten solution of iron and sulfur and a molten residual slag. Slag bath temperatures ranging from 1400 to 1500° C. were maintained and the smelting process was continued until approximately 90% of the iron contained in the initial slag was reduced and collected in the iron-sulfur melt. The molten residual slag was then skimmed from the furnace, after which the molten solution of iron and sulfur was tapped from the furnace and granulated in water to produce a minus ⅜ inch dispersed iron precipitant product. The solidified structure of the granules comprised a multiplicity of metallic iron particles, ranging in size from about 5 to about 10 microns, in a matrix of iron sulfide. This granulated, dispersed iron was ground in a ball mill to minus 35 mesh for use as a copper precipitant.

The end products of the process had the following analyses:

*Dispersed iron precipitant*

| | Percent |
|---|---|
| Fe, total | 84.2 |
| Fe, metal | 64.3 |
| S | 10.9 |

*Final slag*

| | Percent |
|---|---|
| Cu | 0.04 |
| Fe | 6.9 |
| $SiO_2$ | 56.1 |
| MgO | 6.4 |
| CaO | 9.7 |

In actual practice, it will be desirable to also charge a suitable quantity of lime and/or magnesia into the reduction furnace as a basic flux to facilitate the reduction of iron from the silicate slag, to control slag fluidity, and to minimize consumption of furnace refractories, all as is well known in the art.

It should be understood that the grade of the dispersed iron precipitant product can be controlled within wide limits by varying the proportions of raw materials and the extent of iron reduction. The particular grade desirable in any given instance will depend upon the circumstances of use of the product. As grade with respect to metallic iron is increased, size reduction becomes more difficult. Thus, a grade of about 65% metallic iron is preferred for a fine grind of about minus 80 mesh, while a grade of about 85% is preferred for a coarse grind in the neighborhood of minus 10 mesh.

The final slag can be smelted in conventional manner, if desired, for the production of commercial iron. The desirability of so doing will depend, of course, upon how much iron is removed in the production of the dispersed iron precipitant product. This is controlled by the amount of reducing agent used in the reduction furnace. In any event, the production of the precipitant product in accordance with the present process effectively decopperizes the initial copper reverberatory slag and the pyrite and adapts the final slag for subsequent smelting in a suitable reduction furnace, along with a reducing agent and a flux, to produce commercial iron having a minimum copper content, i.e. ranging from about 0.05 to 0.2%.

The precipitation of metallic iron from the molten solution of iron and sulfur in the present process is due to the change of solubility of iron and sulfur as a function of temperature. Accordingly, the particle size of the metallic iron is a function of the cooling rate. Rapid cooling, as by means of water quenching, e.g. running the molten solution into water, not only effects desirable granulation of the product—which facilitates subsequent grinding, but produces very fine particles of metallic iron in the brittle sulfide matrix. At somewhat slower cooling rates, larger particles of iron are precipitated. However, if the cooling rate is too slow, the precipitated iron tends to segregate or settle from the molten sulfide phase before solidification of the melt is complete, which is undesirable.

The desired rapid cooling of the molten solution of iron and sulfur can be effectively achieved by chill casting in small sections, by disintegrating into small drops and chilling in a gaseous medium, and by other techniques in place of granulating in water.

Although copper reverberatory slag is an especially advantageous raw material for the process from an economic standpoint and is readily available to copper producers, a variety of other materials productive of a molten iron and sulfur solution rich in iron can be utilized. For example, iron ore, magnetite concentrates, pyrite calcine, and copper converter slag are useful for supplying the necessary iron, while pyrrhotite (FeS) and copper reverberatory matte may be employed as source materials for sulfur. Metallurgical coke, petroleum coke, and other carbonaceous materials can be used in place of coal as reducing agents.

Melting or preheating of the raw materials prior to their introduction into the electric furnace may be found desirable in order to minimize power requirements for the reduction smelting operation.

Metallic iron can also be employed as a source of iron in the process. If so, a simple melting operation in the presence of a sulfur-bearing material is substituted for reduction smelting. A satisfactory solution of iron and sulfur has been obtained by melting scrap iron and pyrite concentrates in an electric arc furnace and also by adding pyrite concentrates to a molten bath of iron in an electrically heated furnace.

The matrix portion of the product is predominantly iron sulfide, although other heavy metal sulfides will usually be present.

In some instances, a slag utilized as raw material for the process may contain small amounts of a valuable material, such as molybdenum, which is selectively collected from the slag in a molten metallic reduction product corresponding to the molten solution of iron and sulfur, except for the presence of the other valuable material.

Upon cooling of such molten metallic reduction product in the same manner as aforedescribed in connection with the molten solution of iron and sulfur, a brittle, dispersed iron product comprising particles of metallic iron, dispersed through a metallic sulfide matrix, is obtained. The metallic iron contains the valuable material, and, as in the foregoing instances, this product can be easily crushed and ground to practically any size desired for further processing, as, for example, by leaching to extract the iron and liberate the other contained values, as in the copending application of Stuart R. Zimmerley and Russell R. Beck, Serial No. 278,096, filed May 6, 1963, entitled "Process for the Recovery of Molybdenum Values From Ferruginous, Molybdenum-Bearing Slags."

Whereas the specific product and procedure described herein are presently regarded as representing the best modes of carrying out the invention, it should be understood that various changes may be made without departing from the subject matter particularly pointed out and claimed herebelow.

We claim:

1. A method of producing an iron product for use as a precipitant for copper from solution, comprising smelting a copper reverberatory slag and a sulfur-bearing material under reducing conditions to form a molten solution of iron and sulfur, said solution having such an excess of iron over the stoichiometric ratio for FeS as will insure the precipitation of metallic iron from the solution as it cools; and cooling said solution sufficiently rapidly to produce a multiplicity of metallic iron particles dispersed throughout a brittle sulfide matrix.

2. A process of precipitating copper from a copper-bearing solution, comprising bringing said solution into contact with a mass of discrete pieces of a metallic iron precipitant comprising a multiplicity of metallic iron particles dispersed in a matrix of metallic iron sulfide.

3. The process of claim 2, wherein the metallic iron precipitant contains from about 20 to 85 percent by weight of metallic iron.

4. The process of claim 2, wherein the particles of iron in the metallic iron precipitant range in size from about 5 to 10 microns.

5. The method of claim 1, wherein the sulfur-bearing material is iron pyrite.

6. The method of claim 1, wherein the smelting charge is so proportioned and the operation is so controlled that only part of the contained iron is utilized for the precipitant product, the remainder being contained in a slag formed during said smelting operation; and wherein said slag formed during the smelting operation is separately treated for the production of commercial iron.

7. The method of claim 1, wherein the proportioning of smelting charge and the control of smelting operation is such that the metallic iron content of the product is from about 20 to 85 percent of the weight of said product.

8. The method of claim 1, wherein the molten solution of iron and sulfur is cooled by water quenching to produce discrete granules.

9. The method of claim 8, wherein the discrete granules are reduced in size to form a powder.

References Cited by the Examiner

UNITED STATES PATENTS

| | | | |
|---|---|---|---|
| 1,333,688 | 3/1920 | Sulman et al. | |
| 1,739,052 | 12/1929 | White | 75—.5 |
| 1,834,687 | 12/1931 | Davis | 18—47.3 |
| 1,890,934 | 12/1932 | Carson. | |
| 2,305,172 | 12/1942 | Landgraf | 18—47.3 |
| 2,942,334 | 6/1960 | Blue | 75—.5 |
| 2,944,883 | 7/1960 | Queneau et al. | 75—.5 |

FOREIGN PATENTS

| | | |
|---|---|---|
| 463,962 | 3/1950 | Canada. |

OTHER REFERENCES

Newton et al.: Metallurgy of Copper, John Wiley & Sons, New York, 1942, pp. 318–321.

DAVID L. RECK, *Primary Examiner.*